Aug. 10, 1937.  E. KISS  2,089,653
HEATING SYSTEM
Filed April 30, 1936  4 Sheets-Sheet 1

INVENTOR.
Edward Kiss.
BY Maurice Bloch
ATTORNEY.

Aug. 10, 1937.  E. KISS  2,089,653
HEATING SYSTEM
Filed April 30, 1936  4 Sheets-Sheet 2
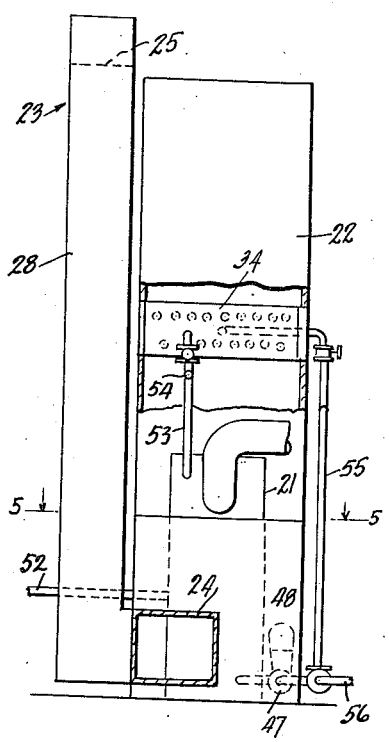
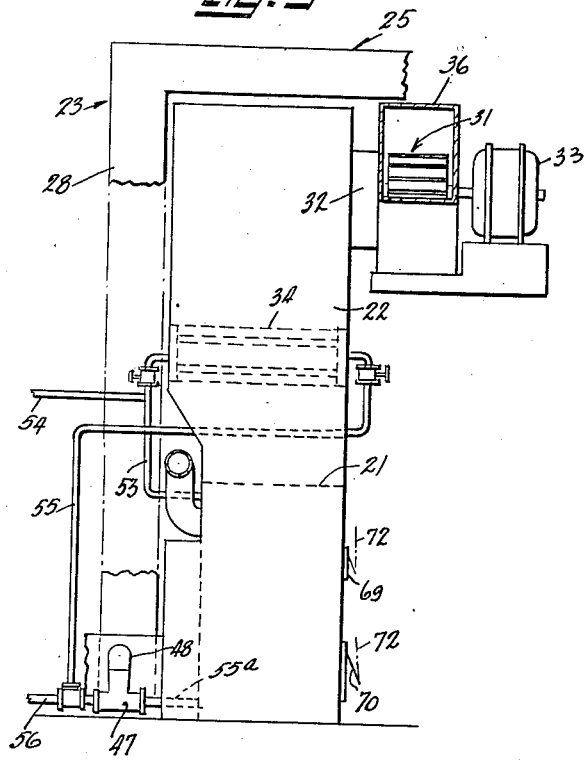
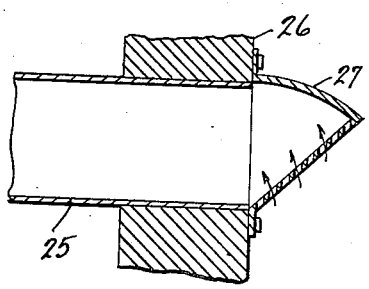
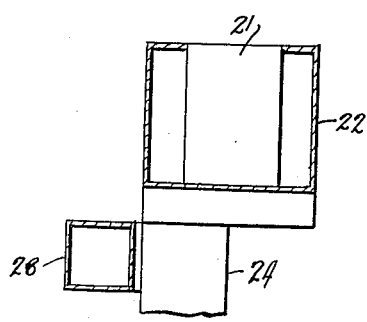
INVENTOR.
Edward Kiss.
BY
ATTORNEY.

Aug. 10, 1937.  E. KISS  2,089,653
HEATING SYSTEM
Filed April 30, 1936  4 Sheets-Sheet 3
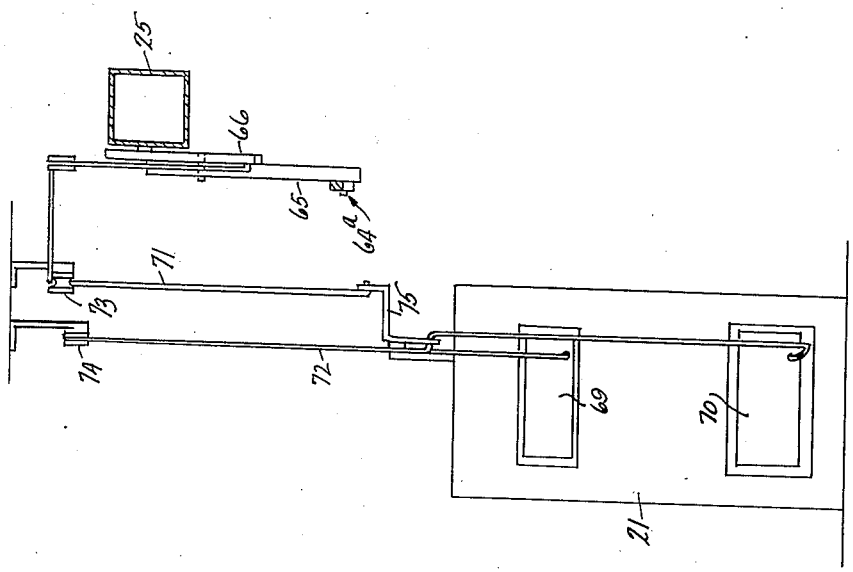
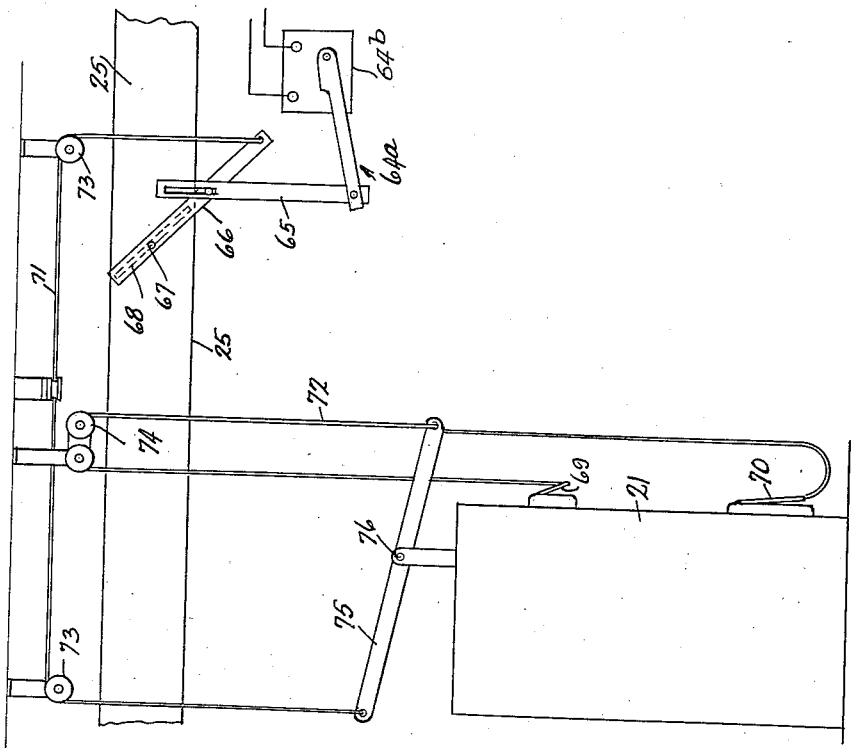
INVENTOR.
Edward Kiss
BY
ATTORNEY.

Aug. 10, 1937.  E. KISS  2,089,653
HEATING SYSTEM
Filed April 30, 1936  4 Sheets-Sheet 4
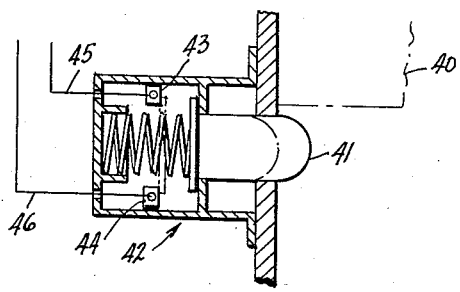
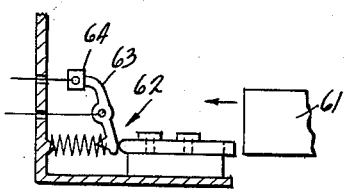
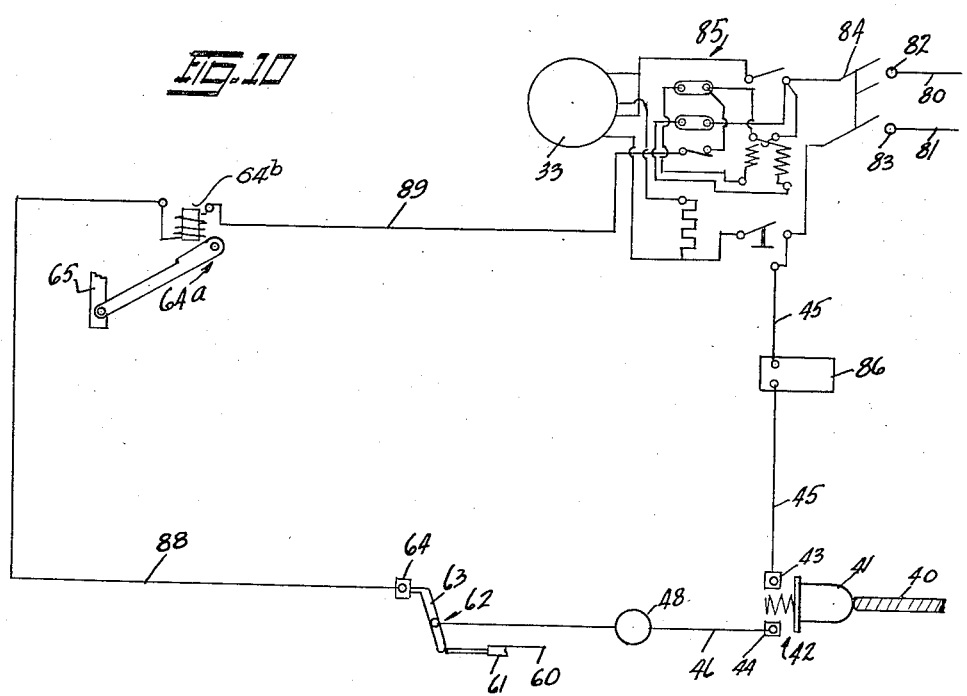
INVENTOR.
Edward Kiss
BY
ATTORNEY.

Patented Aug. 10, 1937

2,089,653

UNITED STATES PATENT OFFICE 2,089,653

HEATING SYSTEM

Edward Kiss, Jackson Heights, N. Y.

Application April 30, 1936, Serial No. 77,085

2 Claims. (Cl. 237—49)

This invention relates to heating systems and controls therefor, and has for one of its objects the provision of an economical heating system and control to prevent the dissipation of heat and at the same time to provide sufficient heat to prevent freezing of the water in the radiators and pipes when the system is shut down for the night.

Another object of the invention is to provide such a heating system which is especially adaptable for use in garages and the like, and which is controlled by means operable by one or more doors.

A further object of the invention is to so arrange the control system that when the garage door is opened the heating system will automatically stop functioning.

A still further object of the invention is to provide additional control means operable by a lock, which when in locked position will automatically shut off the heat and also shut off the drafts for the fire in the boiler.

Other objects and advantages will appear as the nature of the improvements is better understood, the invention consisting substantially in the novel arrangement and co-relation of parts herein fully described and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical impressions, one of which for the purpose of illustration, is shown in the accompanying drawings, in which Figure 1 is a plan view partly in section showing the layout of my improved heating system and control;

Fig. 2 is a fragmental sectional view taken on line 2—2 Fig. 1;

Fig. 3 is a side view looking from the right of Fig. 2;

Fig. 4 is a fragmental sectional view taken on line 4—4 Fig. 1;

Fig. 5 is a fragmental sectional view taken on line 5—5 Fig. 2;

Fig. 6 is a diagrammatic side view showing the fresh air intake damper and boiler dampers control means;

Fig. 7 is a diagrammatic front view thereof;

Fig. 8 is a sectional view showing the switch mechanism operated by the garage door;

Fig. 9 is a similar view of the control switch mechanism operated by a lock on the office or other door which is locked at night and normally unlocked during the day, and Fig. 10 is a wiring diagram showing the electrical connections between the various controls and the fan motor.

Figure 1:
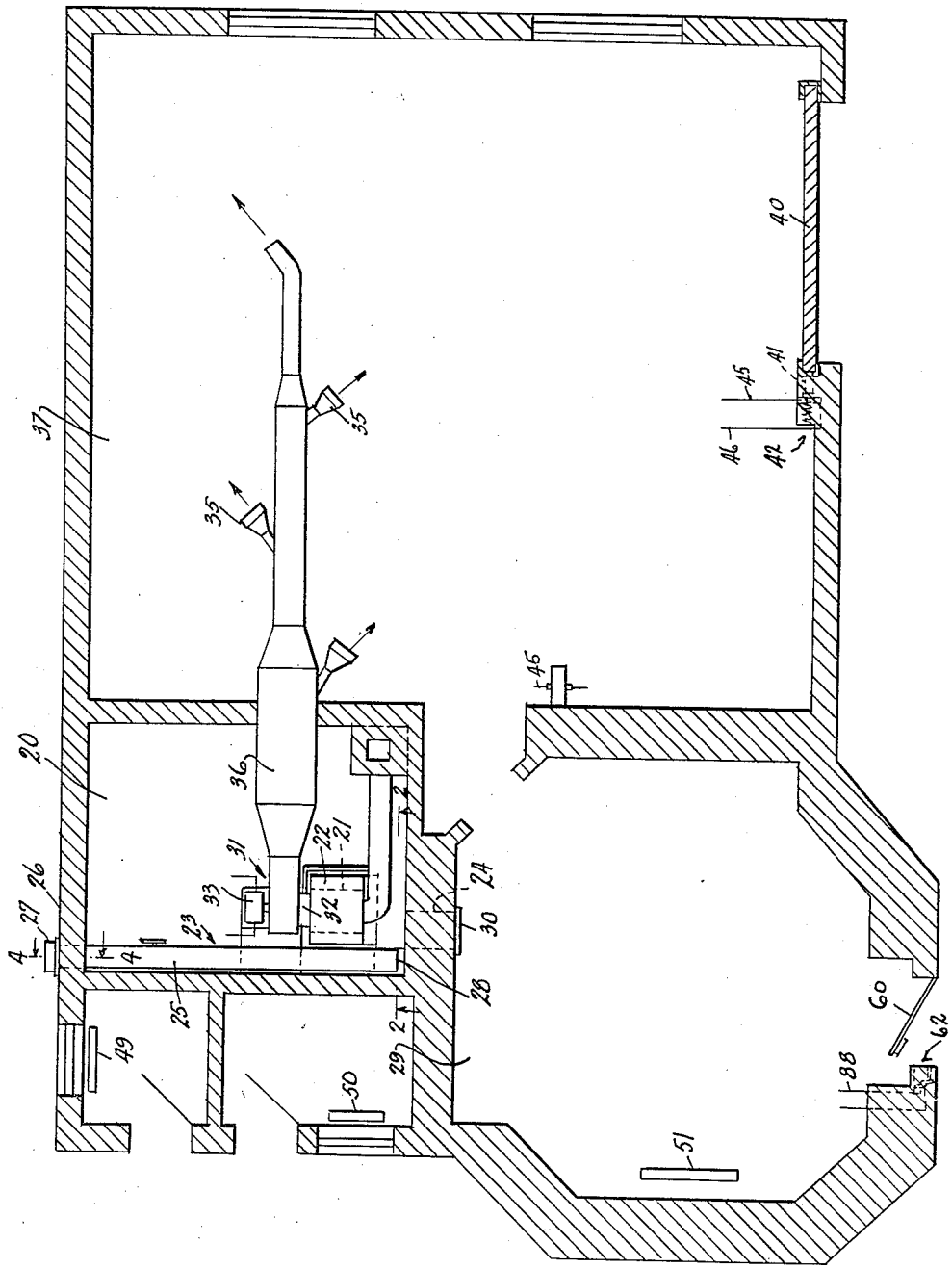

Referring now to the drawings in detail, 20 indicates a boiler room in which there is located a hot water boiler 21 which is enclosed by a jacket or metal housing 22 into which there opens a fresh-air duct 23 and a recirculating-air duct 24. The fresh-air duct comprises an upper horizontal section 25 which extends through a wall 26 into the atmosphere and is covered by a rain hood or louvre 27, and a vertical section 28 which merges with the recirculating duct at the entrance into the jacket 22. The recirculating duct opens into a heated room 29 and is provided with a grille 30.

To the upper portion of the jacket 22 there is connected a suction fan or blower 31 by means of a pipe connection 32. The blower or fan 31 is driven by a motor 33 and draws air from the outside as well as from the room 29, passes same around the boiler 21 and a hot water heater 34 where it is preheated before it enters the blower from whence it is expelled through hot-air ducts 35 extending from the blower casing 36 into automobile garage or repair shop 37.

The said garage or repair shop may be provided with one or more vertically sliding doors 40 only one of which is shown in Fig. 1 of the drawings. Normally when the door 40 is closed, it engages a spring pressed plunger 41 of an electric switch 42 to close the electric circuit by contacting two terminals 43 and 44 having lead wires 45 and 46 respectively which form a part of the electric circuit shown in Fig. 10 for controlling the operation of the fan and motor. It will be seen that when the door 40 is closed, the electric circuit will be completed and the motor and fan will operate and when the door is slid open the contact will be broken and the motor and fan will stop to prevent same from blowing hot air into the garage which will be dissipated through the open door.

Hooked up with the hot water boiler 21 is a booster pump 47 driven by a motor 48 for aiding in the circulation of the water through the said boiler 21, hot water heater 34, and the radiators 49, 50 and 51. The booster pump motor 48 is in series circuit with the fan motor 33 so that the pump operates only when the fan is operating. Water is supplied to the boiler 21 through a pipe 52 and the water passes through the boiler and out through a pipe 53 to the special heater 34 and through a pipe line 54 which leads to the radiators 49, 50 and 51. The hot water from the heater 34 is returned to the boiler through a pipe line 55 and 55a and the water from the radiators is returned through a pipe 56.

The system is shut down at night and through an electric switch operated by the locking of a door 60 which may be the office door or any other door. When the said door is locked the lock-bolt 61 (Fig. 9) operates an electric switch 62 to swing a spring-pressed lever 63 and break the electric contact between the said lever and a contact plate 64. This action stops the motor and fan, and also de-energizes an electro-magnet 64$^b$, the armature 64$^a$ of which is connected mechanically to a lever arm 65 operably connected to a lever 66 fixed to the pivot 67 of a damper 68 in the fresh-air duct section 25. When the said electro-magnet 64$^b$ is de-energized its armature is in the position shown in Fig. 6 with the damper 67 closed, and the fire damper 69 opened and the ash-pit damper 70 closed to shut off the draft of the boiler. Simultaneous adjustment of the dampers 68, 69 and 70 is accomplished by means of chains or cords 71 and 72 which pass over sets of pulleys 73 and 74, the chain or cord 71 having one end connected to one end of the lever 66, its other end connected to one end of a lever or rocker bar 75 pivoted at 76, and the chain or rope 72 having an intermediate portion secured to the opposite end of the lever and its ends secured to the dampers 69 and 70.

Referring to Fig. 10 of the drawings 80 and 81 are the main electric supply wires which are connected to terminals 82 and 83 which may be closed by a switch 84 to close the electric circuit. When the said switch 84 and the door 40 are closed and the office door 60 unlocked, the circuit will be closed and current will flow through to operate the fan motor, booster motor and the various dampers. Suitably connected in the electric circuit is a relay system 85 and a thermostat 86 which is adapted to break the electric circuit when the temperature in the garage or shop is above a predetermined degree. The coil of the electro-magnet 64$^b$ is shown connected to the contact 64 by a lead wire 88 and to the relay by a wire 89.

From the foregoing it will be seen that I have provided an economic hot water and hot air heating system which will prevent the dissipation of heat through the open door of the room being heated, and also prevent the freezing of the water in the system when same is shut off for the night. The prevention of the heat dissipation is due to the fact that heat supply is automatically stopped by the opening of the door, and the water is prevented from freezing due to the fact that as long as there is any fire in the boiler the water be sufficiently warm to circulate through the system.

It will also be seen that I have provided positive means for automatically shutting off the system at night by merely locking a predetermined lock.

Having described my invention, what I claim as new and desire to secure by Letters Patent is:

1. In a heating system for a building, a boiler, a closed jacket about said boiler, a fresh-air duct opening into the jacket, a re-circulating-air duct merging with a portion of the fresh-air duct within the jacket, a casing in open communication with the jacket above said boiler, a suction fan in said casing, an electric motor for driving said fan, a hot-air duct leading from the casing for delivering warm air into a room of the building, a damper in the fresh-air duct, mechanical means for operating the damper, electric means in circuit with the motor for actuating said mechanical means, an electric switch in the circuit for controlling operation of the motor and the electrical means, and a fire door damper and an ash pit door damper in the boiler connected with and operated by the mechanical means for operating the damper of the fresh air duct.

2. In a heating system for a building, a boiler, a closed jacket about said boiler, a fresh-air duct opening into the jacket, a recirculating-air duct, a casing in open communication with the upper portion of said jacket, a suction fan in the casing, an electric motor for driving said fan, a hot-air duct leading from said casing, a damper in the fresh air duct, a lever for operating the damper, an electro-magnet in circuit with the motor, a pivoted armature for said magnet, a link connecting said armature with said lever, a switch in the circuit controlling the operation of the motor and the electro-magnet, a fire door damper and an ash pit door damper on the boiler, a rocker bar pivoted intermediate its length, a line connected at its ends to the dampers of the boiler doors and having its intermediate portion secured to one end of said rocker bar, and a line connecting the other end of the rocker bar with said lever.

EDWARD KISS.